(12) United States Patent  
Kittinger et al.

(10) Patent No.: US 8,130,156 B2
(45) Date of Patent: Mar. 6, 2012

(54) CENTER HIGH MOUNT STOP LAMP ASSEMBLY WITH INTEGRATED RADIO FREQUENCY ANTENNA

(75) Inventors: Gregg R. Kittinger, Pontiac, MI (US); Donald B. Hibbard, Jr., Howell, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 415 days.

(21) Appl. No.: 12/398,330

(22) Filed: Mar. 5, 2009

(65) Prior Publication Data

US 2010/0225549 A1   Sep. 9, 2010

(51) Int. Cl.
*H01Q 1/32* (2006.01)
(52) U.S. Cl. ....................................... 343/713; 343/721
(58) Field of Classification Search .................. 343/721, 343/713, 711
See application file for complete search history.

(56) References Cited

U.S. PATENT DOCUMENTS

| | | | | |
|---|---|---|---|---|
| 3,683,379 A | * | 8/1972 | Saddler et al. | 342/71 |
| 5,446,470 A | * | 8/1995 | Avignon et al. | 343/713 |
| 5,963,172 A | * | 10/1999 | Pfizenmaier et al. | 343/721 |
| 6,885,349 B2 | * | 4/2005 | Hickel | 343/713 |

* cited by examiner

*Primary Examiner* — Hoanganh Le
(74) *Attorney, Agent, or Firm* — Ingrassia Fisher & Lorenz, P.C.

(57) ABSTRACT

A center high mount stop lamp (CHMSL) assembly for a vehicle includes an integrated radio frequency (RF) antenna. The CHMSL assembly has an outer lens element, a lamp assembly configured to emit light through the outer lens element, and a housing for the outer lens element and the lamp assembly. The housing is adapted for attachment to an upper rear portion of the vehicle, and the housing has an interior region defined therein. The CHMSL assembly also has an RF antenna element located within the interior region. The RF antenna element is configured and positioned such that it does not obstruct a light path from the lamp assembly to the outer lens element.

20 Claims, 6 Drawing Sheets

CENTER HIGH MOUNT STOP LAMP ASSEMBLY WITH INTEGRATED RADIO FREQUENCY ANTENNA

TECHNICAL FIELD

Embodiments of the subject matter described herein relate generally to lamp assemblies used for vehicles. More particularly, embodiments of the subject matter relate to a lamp assembly having a radio frequency (RF) antenna integrated therein.

BACKGROUND

Automobile manufacturers have been designing vehicles with radio systems for many years. A basic onboard radio system typically includes an AM/FM receiver and one or more antennas that are designed to receive RF signals in the AM and FM frequency bands. Older vehicles employ external whip antennas that tend to detract from the visual appearance of the vehicles. Such whip antennas are also prone to breakage and can adversely impact the aerodynamic performance of the vehicles.

Some modern vehicles incorporate an FM antenna element into the windshield glass and/or the rear window. Moreover, some vehicles utilize the rear window defroster element as the FM and/or AM antenna element. Such deployments, however, require sufficiently large windows that can adequately accommodate the antenna element(s). Unfortunately, certain vehicle designs, such as hatchbacks, compacts, and convertibles, lack the window space for integrated antennas. Moreover, integrating an AM antenna into the rear window defroster element requires large inductors in line to the defroster power and ground feeds, which increases cost, vehicle mass, and parts count, and introduces packaging issues. Accordingly, it may be difficult or impossible to deploy a window-integrated antenna in some vehicles.

Although a window-integrated antenna results in better aerodynamics and a cleaner overall vehicle appearance, the antenna element itself remains visible as a wire or conductive trace in the window. Thus, although less physically obtrusive, a window-integrated antenna remains visible to the customer. Such antenna visibility may be undesirable to some customers.

It is well established that AM frequencies are highly susceptible to RF interference and, in particular, RF interference caused by onboard sources such as the vehicle ignition system, motors, generators, switches, controllers, etc. A window-integrated AM antenna may have higher sensitivity to such interference, due to the manner in which it is applied to the interior surface of the window. Thus, a window-integrated AM antenna may perform less than adequately and/or it might require additional components or circuitry designed to filter noise received from onboard sources of RF energy.

BRIEF SUMMARY

A center high mount stop lamp (CHMSL) assembly for a vehicle is provided. The CHMSL assembly includes an outer lens element, a lamp assembly configured to emit light through the outer lens element, and a housing for the outer lens element and the lamp assembly. The housing is adapted for attachment to an upper rear portion of the vehicle, and the housing has an interior region defined therein. The CHMSL assembly also includes an RF antenna element located within the interior region of the housing. The RF antenna element is configured and positioned such that it does not obstruct a light path from the lamp assembly to the outer lens element.

A CHMSL architecture for a vehicle is also provided. The CHMSL architecture includes electrically conductive body structure for the vehicle, and a CHMSL assembly adapted for attachment at a mounting location of the vehicle, the mounting location being proximate the electrically conductive body structure. The CHMSL assembly includes an outer lens element, a lamp assembly configured to emit light through the outer lens element, and an RF antenna element that is tuned in accordance with the electrically conductive body structure.

Also provided is a lamp assembly for a vehicle. The lamp assembly includes an outer lens element, a light emitting element configured to emit light through the outer lens element, and a housing for the outer lens element and the light emitting element, the housing having an interior region defined therein. The lamp assembly also includes an AM radio antenna element located within the interior region, the AM radio antenna element being configured and positioned such that it does not obstruct a light path from the light emitting element to the outer lens element.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description may refer to elements or features being "coupled" together. As used herein, unless expressly stated otherwise, "coupled" means that one element/feature is directly or indirectly joined to (or directly or indirectly communicates with) another element/feature, and not necessarily mechanically.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard, " and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

For the sake of brevity, conventional techniques related to vehicle manufacturing, RF antenna design, electronic component packaging, radio receiver operation, and other functional aspects of the systems (and the individual operating components of the systems) may not be described in detail herein.

The subject matter described herein relates to a lamp assembly for a vehicle that includes an RF antenna integrated therein. Although the preferred embodiments relate to a CHMSL assembly, the concept can be extended for use with other types of lamp assemblies. For the preferred embodiments, an AM radio antenna is hidden in the housing of the CHMSL assembly such that the antenna does not impact the exterior styling of the vehicle. In addition, the preferred embodiments exhibit good AM reception that is at least equivalent to that of a fixed mast or whip antenna. Moreover, since the antenna itself is not located within the passenger cabin of the vehicle, and is not surrounded by the exterior body panel structure of the vehicle, interference caused by electronic devices and sources internal to the vehicle is minimized. In this regard, the vehicle body structure shields and isolates the antenna element from electromagnetic interference from onboard devices such as controllers, switches, high current devices, and the like.

Figure 1:
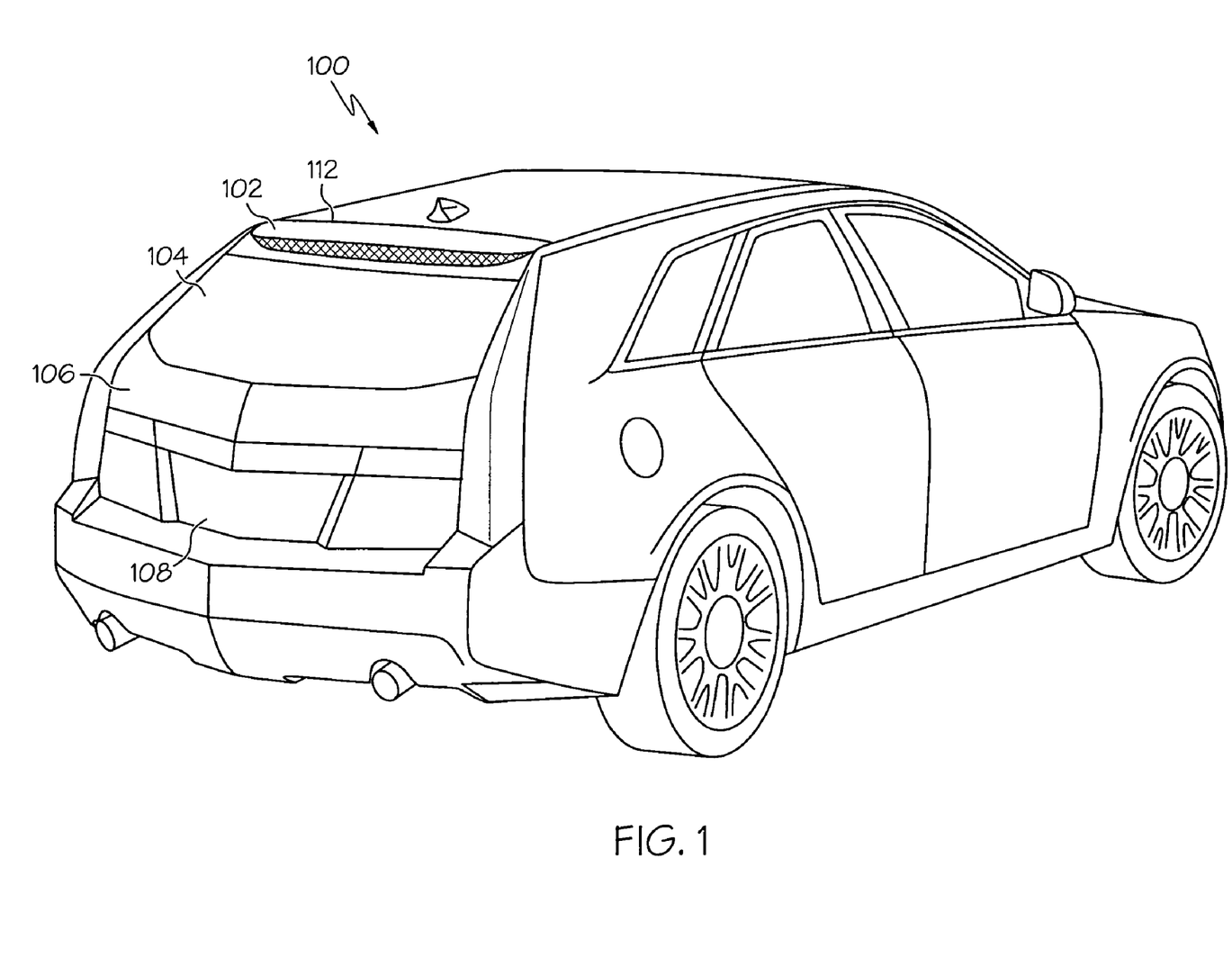
FIG. 1 is a perspective view of a vehicle having a CHMSL that includes an RF antenna incorporated therein.

FIG. 1 is a perspective view of a vehicle 100 having a CHMSL assembly 102 that includes an RF antenna incorporated therein. Other vehicle platforms and configurations could be used, and the wagon/hatchback version shown in FIG. 1 is only one of many possible implementations. The primary function of CHMSL assembly 102 is to provide a third stop lamp for vehicle 100. In accordance with established convention, CHMSL assembly 102 is located at an upper rear portion of vehicle 100, e.g., at or near the top of the rear window 104. CHMSL assembly 102 includes one or more lamps, light emitting elements, bulbs, or flashers that are activated when the brakes are actuated or commanded. In this regard, the stop lamp functionality of CHMSL assembly 102 can be activated in a conventional manner by a suitably configured brake pedal sensor or other control mechanism onboard vehicle 100.

Figure 2:
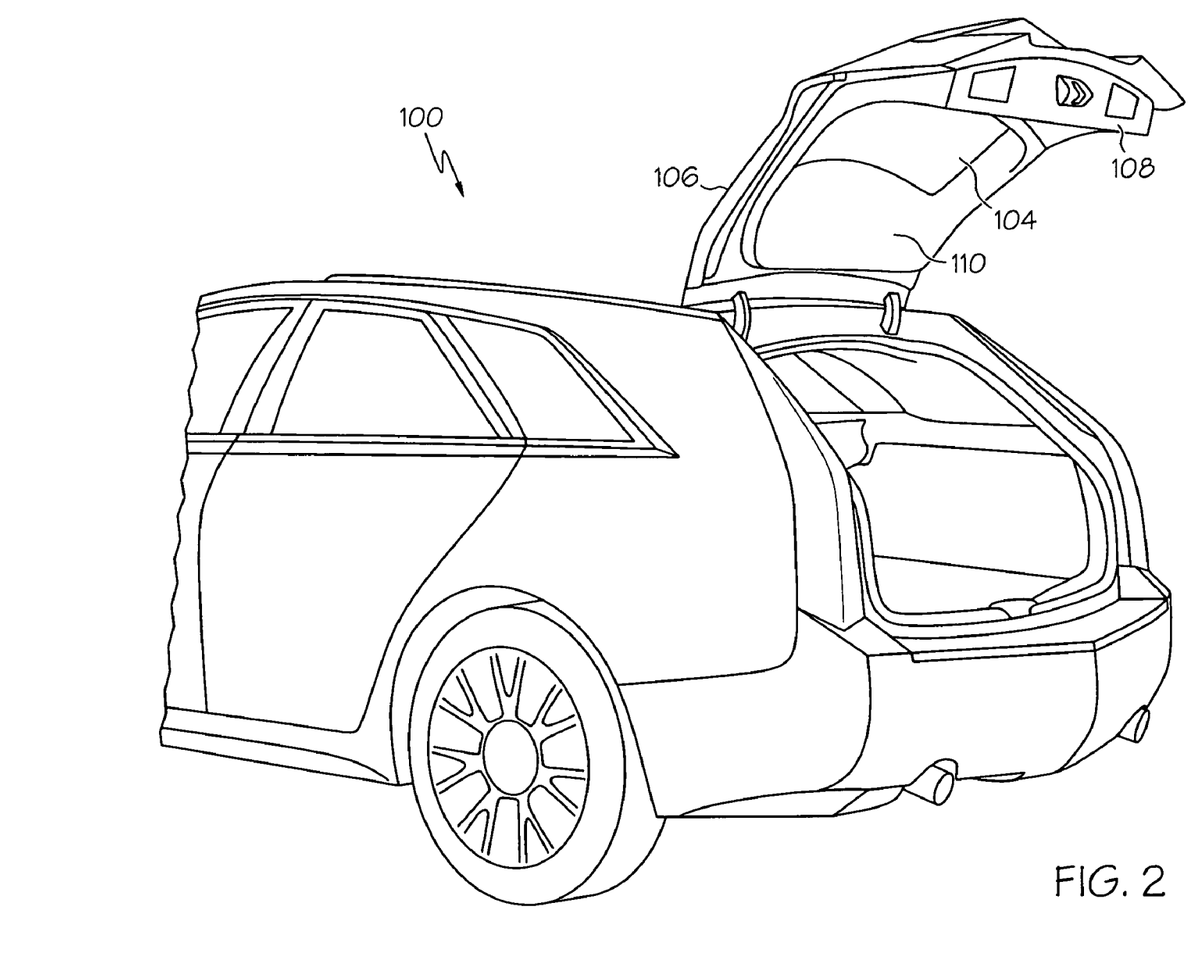
FIG. 2 is a perspective view of the vehicle shown in FIG. 1 with its hatchback door open.

CHMSL assembly 102 may include a housing or trim piece (see FIGS. 3-5) that is adapted for attachment or coupling to an upper rear portion of vehicle 100. For example, as depicted in FIG. 1, CHSML assembly 102 can be mounted to rear window 104 and/or to the hatchback frame or structure 106 of vehicle 100. In preferred embodiments, CHMSL assembly 102 is visible only from the exterior of vehicle 100. In this regard, vehicle 100 may include one or more structural panels, interior trim pieces, or components that could be used to cover or hide a portion of CHMSL assembly 102. For example, FIG. 2 is a perspective view of vehicle 100 with its hatchback door 108 open; CHMSL assembly 102 is hidden from an interior view. For this illustrated embodiment, CHMSL assembly 102 is hidden by an interior trim piece 110.

Figure 3:
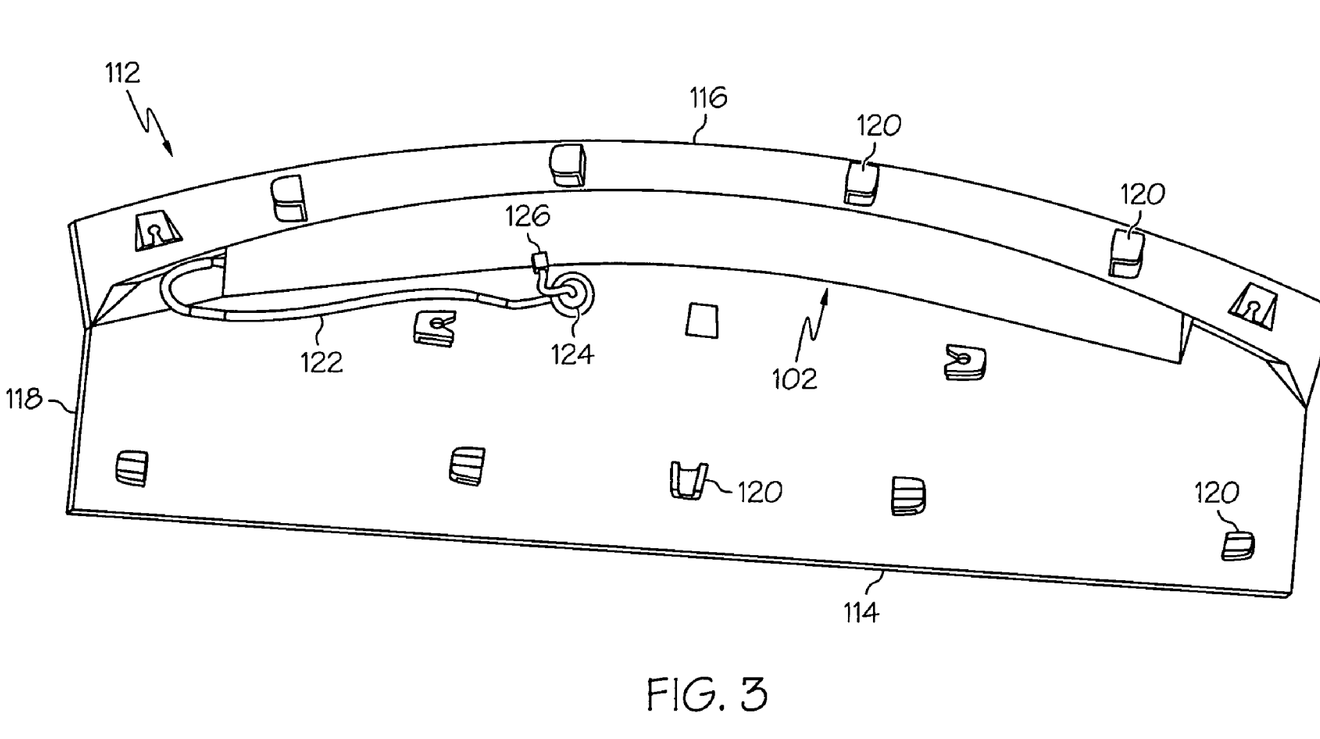
FIG. 3 is a perspective view of the underside of a trim panel and CHMSL assembly that includes an RF antenna incorporated therein.

Although not a requirement, CHMSL assembly 102 may be mounted to, integrated with, or incorporated into an exterior trim panel 112, which in turn is mounted to rear window 104 and/or to the hatchback frame or structure 106. In this regard, FIG. 3 is a perspective view of the underside of trim panel 112 and CHMSL assembly 102. FIG. 1 shows an exemplary mounting location for trim panel 112. For this particular embodiment, at least a portion of CHMSL assembly 102 protrudes from trim panel 112 such that CHMSL assembly 102 is visible from the exterior of vehicle 100.

Referring to FIG. 3, trim panel 112 has a leading edge 114, a trailing edge 116, and side edges 118. In this embodiment, leading edge 114 is substantially straight, and trailing edge 116 is curved outward. The side edges 118 of trim panel 112 define the width of a main section of trim panel 112; for this example, the width of trim panel 112 between the side edges 118 roughly corresponds to the width of rear window 104 (see FIG. 1). The underside of trim panel 112 may include a number of fixation features 120 that can be utilized to secure trim panel 112 to other structural elements of vehicle 100.

Notably, CHMSL assembly 102 is secured to trim panel 112 in a manner that allows at least the outer lens of CHMSL assembly 102 to be visible from the exterior of vehicle 100. CHMSL assembly 102 can be attached to trim panel 112 using any appropriate technique, component, material, or fastener. For example, in preferred embodiments, CHMSL assembly 102 is coupled to trim panel 112 using fasteners, such as screw fasteners. In the depicted embodiment, CHMSL assembly 102 is positioned near trailing edge 116 of trim panel, as shown in FIG. 3. This rearward mounting location is desirable to ensure good visibility of the lamp (or lamps) incorporated into CHMSL assembly 102.

As explained in more detail below, CHMSL assembly 102 includes an RF antenna element integrated therein (the antenna element is hidden from view in FIG. 3). In certain embodiments, the RF antenna element is used to receive AM radio signals (although other applications and frequency bands may be accommodated) for the onboard entertainment system. Accordingly, CHMSL assembly 102 may include a suitably configured antenna lead 122 that can be used to transfer RF signals received by the antenna element. For this particular embodiment, antenna lead 122 feeds through a grommet 124, which in turn is installed in an appropriate location on trim panel 112 and/or a different trim piece, component, or panel of vehicle 100. Antenna lead 122 may terminate at a connector 126 for mating with a plug, terminal, or matching cable connector that is associated with an amplifier or the radio head unit itself. Antenna lead 122, grommet 124, and connector 126 enable CHMSL assembly 102 to be fabricated as a modular component, facilitating easy coupling of the integrated antenna element to the equipment or components that process the received RF signals.

Figure 4:
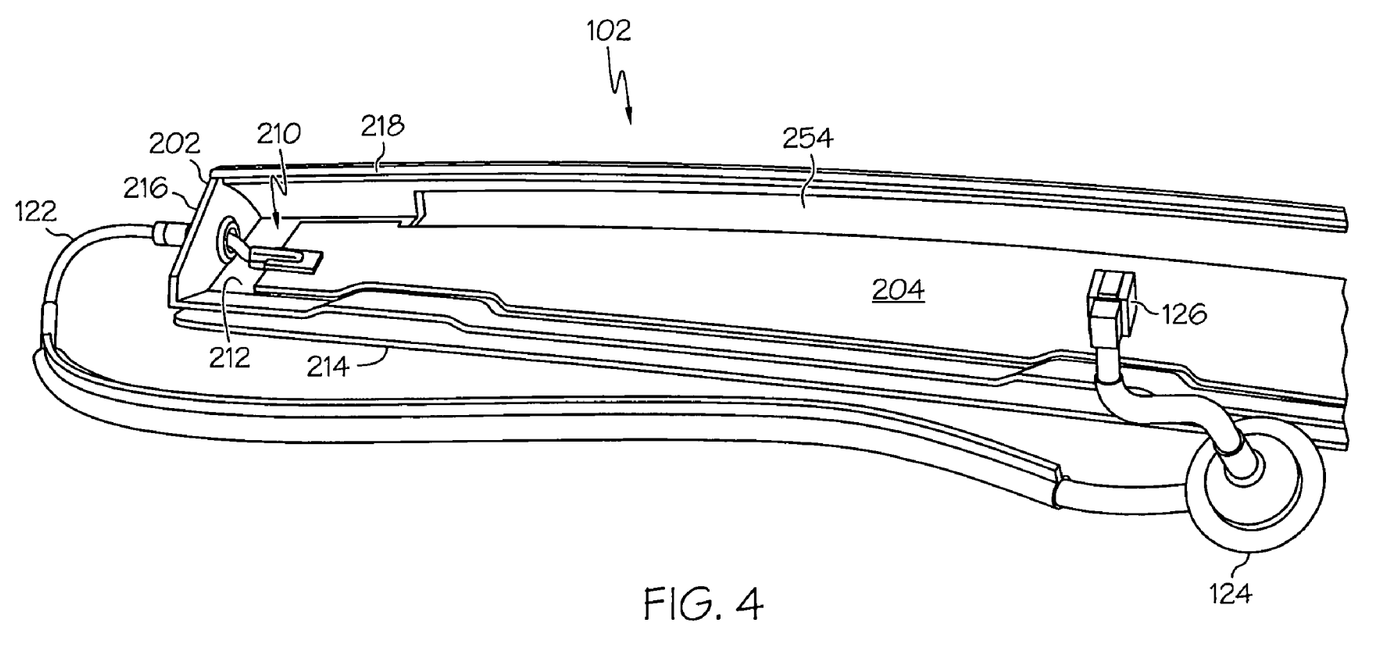
FIG. 4 is a perspective view of the interior region of a CHMSL assembly that includes an RF antenna incorporated therein.
Figure 5:
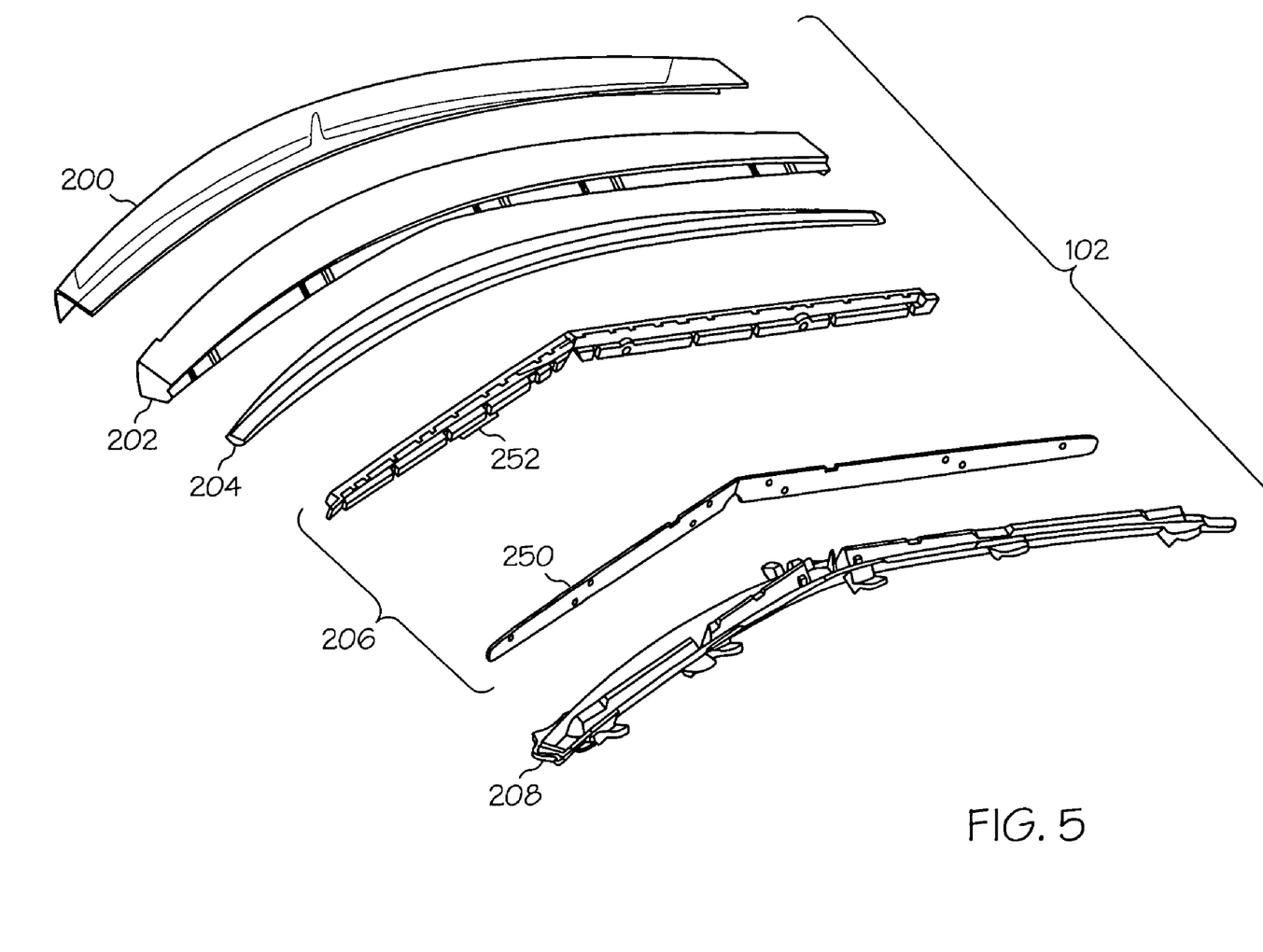
FIG. 5 is an exploded perspective view of an exemplary embodiment of a CHMSL assembly that includes an RF antenna incorporated therein.

FIG. 4 is a perspective underside view of the interior region of CHMSL assembly 102, and FIG. 5 is an exploded top perspective view of CHMSL assembly 102. When deployed, CHMSL assembly 102 may include a base cover or lid that protects its components and electronics. For ease of illustration, this base cover is not shown in FIG. 4 or FIG. 5. CHMSL assembly 102 generally includes, without limitation: an outer lens element 200 (not shown in FIG. 4); a housing 202; an RF antenna element 204; a lamp assembly 206 (not shown in FIG. 4); and a mounting structure 208 (not shown in FIG. 4). For simplicity, antenna lead 122, grommet 124, and connector 126 are not depicted in FIG. 5.

Housing 202 is shaped, sized, and otherwise configured for use with outer lens element 200, lamp assembly 206, and RF antenna element 204. The particular shape, size, and configuration of housing 202 can vary according to the design of the host vehicle, the neighboring structure to which it couples, and/or neighboring conductive structure (such as framing). In preferred embodiments, housing 202 is formed from a dielectric (electrically insulating) material such as plastic or fiberglass, and housing 202 is formed in accordance with conventional fabrication techniques such as injection molding. Housing 202 and/or mounting structure 208 may be adapted for attachment to an upper rear portion of the host vehicle, or it may be adapted for attachment to a piece (such as trim panel 112), which in turn is attached to an appropriate mounting location of the vehicle.

Housing 202 includes or generally defines an interior region 210 (see FIG. 4). Interior region 210 is shaped and sized to accommodate RF antenna element 204, lamp assembly 206, and possibly other components and features of CHMSL assembly 102. Housing 202 includes a major surface 212 to which RF antenna element 204 is coupled. For the illustrated embodiment, major surface 212 is generally defined to be the area between the leading edge 214 of housing 202, the sidewalls 216 of housing 202, and the trailing wall 218 of housing 202. Notably, major surface 212 may be flat or it may have a curved, angular, or sloped contour, depending upon the particular design of the host vehicle.

RF antenna element 204 is located within interior region 210 of housing 202, as shown in FIG. 4. In certain embodiments, RF antenna element 204 is affixed to the major surface 212 of housing 202 using any suitable technique, such as adhesive tape, glue or other adhesive material, fasteners, clips, press fitting, or the like. In practice, the size, shape, thickness, other dimensions, material (or materials), and construction methodology of RF antenna element 204 can be selected to accommodate the desired RF frequency band, frequency range, or selected frequencies. Thus, the physical configuration and electromagnetic characteristics of RF antenna element 204 can be tuned as needed to support the particular onboard vehicle subsystem or subsystems.

For example, RF antenna element 204 may include or be realized as a flat plate that is formed from an electrically conductive material such as aluminum, copper, or another metal. The design of the RF antenna element is not limited to a plate construction, and an alternative RF antenna element embodiment could be formed using a thin conductive element or wire. In practice, an aluminum plate having a thickness of about 0.3 mm to 2.0 mm could be used as the material for RF antenna element 204. Moreover, RF antenna element 204 can be sized, shaped, and tuned to accommodate AM radio frequencies, FM radio frequencies, UHF frequencies (e.g., 300 MHz to 3.0 GHz, typically used for mobile telephone, wireless networking, and remote keyless entry applications), SHF frequencies (e.g., 3.0 GHz to 30 GHz, typically used for wireless networking and satellite applications), and/or other RF frequency bands and ranges.

In some preferred embodiments, RF antenna element 204 represents the AM antenna for the vehicle, and it is suitably configured and tuned to receive RF signals between 530 kHz and 1710 kHz (of course, RF antenna element 204 could be tuned to receive frequencies outside of this stated range). In such embodiments, a separate FM antenna could be used in conjunction with RF antenna element 204.

Although not depicted in the figures, CHMSL assembly 102 could include more than one integrated RF antenna element. For example, CHMSL assembly 102 might include an AM antenna element and a separate and distinct FM antenna element located within interior region 210 (assuming that size, packaging, and vehicle design requirements can be satisfied). Indeed, the number of distinct RF antenna elements could exceed two as long as housing 202 is large enough to accommodate all of them.

Figure 6:
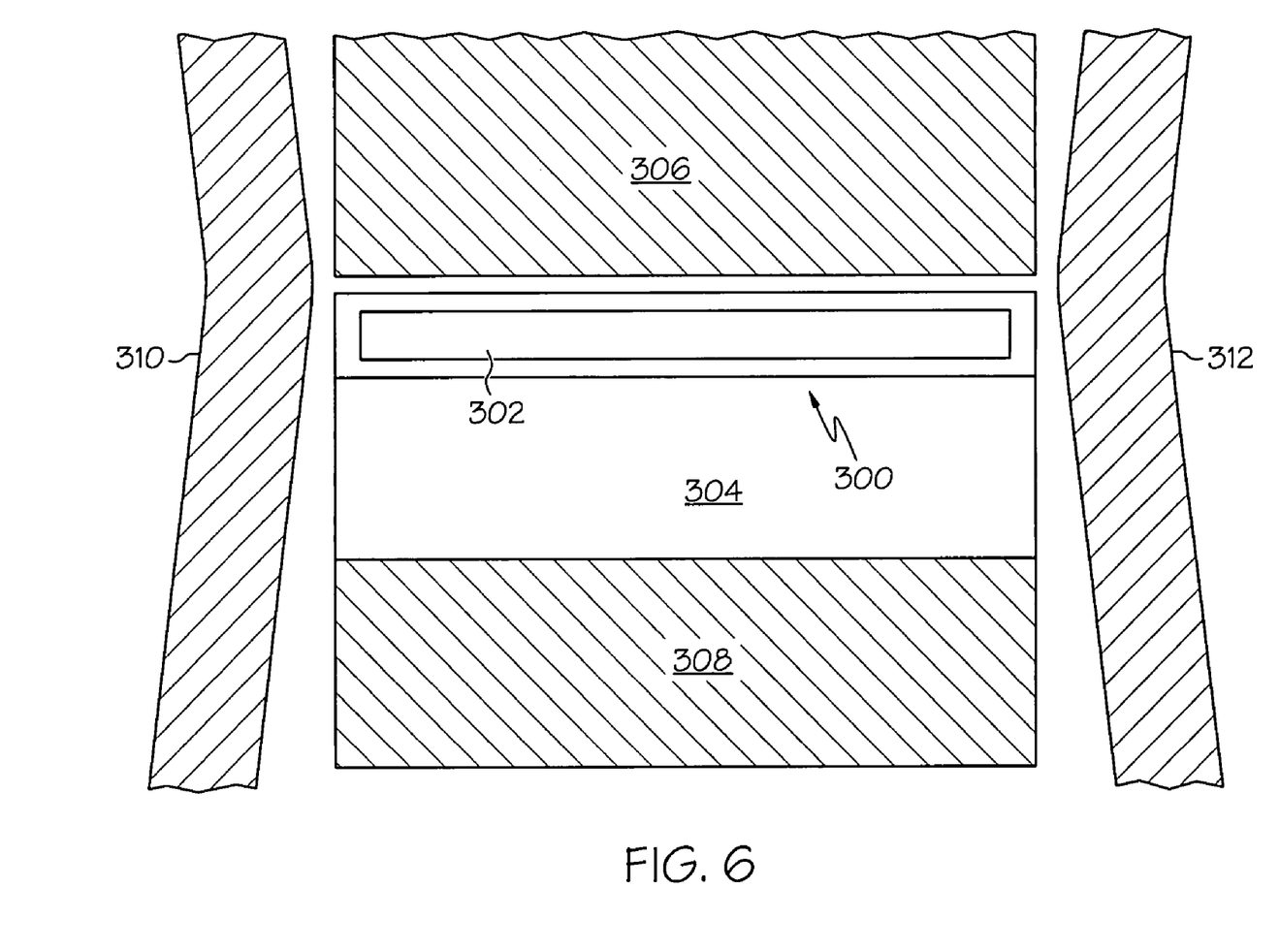
FIG. 6 is a diagram that depicts a mounting location of a CHMSL assembly relative to surrounding metal structures of the host vehicle.

In preferred embodiments, RF antenna element 204 is shaped, sized, configured, and tuned in accordance with electrically conductive structures of the host vehicle, where such structures are located proximate the mounting location of CHMSL assembly 102. As mentioned previously, this mounting location will typically be a location at or near the upper rear portion of the vehicle. In this regard, FIG. 6 is a diagram that depicts a mounting location 300 of a CHMSL assembly 302 relative to surrounding metal structures of the host vehicle. FIG. 6 represents an "unfolded" schematic view of the upper rear portion of the vehicle, with schematic depictions of the following vehicle features: a rear window 304; a roof structure 306; a hatchback door structure 308; a driver side frame structure 310; and a passenger side frame structure 312. For this example, roof structure, hatchback door structure 308, driver side frame structure 310, and passenger side frame structure 312 all represent electrically conductive structures in that they all contain or are formed from metal. Although rear window 304 itself is formed from a generally non-conductive material such as glass or plastic, it may contain (or have attached thereto) electrically conductive elements such as a defroster element and/or antenna elements. It should be appreciated that the vehicle may include other electrically conductive structures or components that are located proximate to CHMSL assembly 302.

The impact of surrounding conductive structures may vary from one deployment to another, and the RF antenna element in CHMSL assembly 302 can be tuned to compensate for the presence of such conductive structures. Accordingly, the RF antenna element may be specifically designed to optimize performance on a model-by-model basis. In practice, the electrically conductive components near CHMSL assembly 302 might influence the performance of the RF antenna element integrated into CHMSL assembly 302. Thus, the combination of CHMSL assembly 302 and electrically conductive body structure of the vehicle could be considered to be a CHMSL architecture or subsystem for the vehicle.

Referring again to FIG. 5, lamp assembly 206 is suitably configured to emit light through outer lens element 200 when activated. In practice, lamp assembly 206 may include any number of light emitting elements that cooperate to function as a stop lamp for the vehicle. The illustrated embodiment of lamp assembly 206 includes a printed circuit board or card 250, which is coupled to an array of light emitting diodes (LEDs) and an inner lens. The LEDs and inner lens are depicted as an LED assembly 252 in FIG. 5. After fabrication of CHMSL assembly 102, the LEDs will be aligned with, and visible through, an opening 254 formed in the trailing wall 218 of housing 202 (see FIG. 4). Such alignment ensures that the light emitted from the LEDs will illuminate outer lens element 200, for visibility from the exterior of the vehicle.

Notably, RF antenna element 204 is shaped, sized, configured, and positioned within interior region 210 such that it does not obstruct the light path (or paths) from lamp assembly 206 to outer lens element 200. As shown in FIG. 4, RF antenna element 204 is attached in an unobtrusive location (the major surface 212), and the LEDs of lamp assembly 206 are directed toward opening 254—RF antenna element 204 does not block the path of light. Moreover, housing 202 and outer lens element 200 may be cooperatively configured such that RF antenna element 204 is hidden (or substantially hidden) from an external view of CHMSL assembly 102. In other words, RF antenna element 204 is not visible from the exterior of the vehicle. This promotes a clean look and effectively hides RF antenna element 204.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A center high mount stop lamp (CHMSL) assembly for a vehicle, the CHMSL assembly comprising:
   an outer lens element;
   a stop lamp assembly configured to emit light through the outer lens element;
   a housing for the outer lens element and the lamp assembly, the housing adapted for attachment to an upper rear portion of the vehicle outside of the passenger cabin of the vehicle and external to a rear window of the vehicle, and the housing having an interior region defined therein; and
   a radio frequency (RF) antenna element located within the interior region of the housing, the RF antenna element being configured and positioned such that it does not obstruct a light path from the lamp assembly to the outer lens element, and the RF antenna element being located outside of the passenger cabin of the vehicle and external to the rear window of the vehicle.

2. The CHMSL assembly of claim 1, wherein the RF antenna element is shaped and sized to accommodate AM radio frequencies.

3. The CHMSL assembly of claim 2, further comprising an FM antenna element located within the interior region, the FM antenna element being configured and positioned such that it does not obstruct the light path from the stop lamp assembly to the outer lens element.

4. The CHMSL assembly of claim 1, wherein the RF antenna element is shaped and sized to accommodate FM radio frequencies.

5. The CHMSL assembly of claim 4, further comprising an AM antenna element located within the interior region, the AM antenna element being configured and positioned such that it does not obstruct the light path from the stop lamp assembly to the outer lens element.

6. The CHMSL assembly of claim 1, wherein the RF antenna element is shaped and sized to accommodate UHF frequencies.

7. The CHMSL assembly of claim 1, wherein the RF antenna element is shaped and sized to accommodate SHF frequencies.

8. The CHMSL assembly of claim 1, the RF antenna element comprising a flat plate formed of an electrically conductive material.

9. The CHMSL assembly of claim 1, wherein:
   the vehicle includes a mounting location for the CHMSL assembly; and
   the RF antenna element is shaped and sized in accordance with electrically conductive structures of the vehicle located proximate the mounting location.

10. The CHMSL assembly of claim 1, wherein the housing and the outer lens element are cooperatively configured such that the RF antenna element is hidden from an external view of the CHMSL assembly.

11. A vehicle, comprising:
   electrically conductive body structure;
   a passenger cabin;
   an exterior trim panel coupled to the body structure and located outside the passenger cabin;
   a center high mount stop lamp (CHMSL) assembly integrated with the exterior trim panel for attachment at a mounting location of the vehicle external to a rear window of the vehicle, the mounting location being proximate the electrically conductive body structure, the CHMSL assembly comprising:
      an outer lens element;
      a stop lamp assembly configured to emit light through the outer lens element; and
      a radio frequency (RF) antenna element that is tuned in accordance with the electrically conductive body structure, the RF antenna element being located external to the rear window of the vehicle.

12. The CHMSL architecture of claim 11, wherein the CHMSL assembly further comprises a housing for the outer lens element and the stop lamp assembly, the housing adapted for attachment to the mounting location of the vehicle.

13. The CHMSL architecture of claim 11, wherein the RF antenna element is tuned for operation with AM radio frequencies, FM radio frequencies, UHF frequencies, or SHF frequencies.

14. The CHMSL architecture of claim 11, the RF antenna element comprising a flat metal plate.

15. A lamp assembly for a vehicle, the lamp assembly comprising:
   an outer lens element;
   a light emitting element configured to emit light through the outer lens element;
   a housing for the outer lens element and the light emitting element, the housing having an interior region defined therein to form a modular component coupled to an upper rear portion of the vehicle external to and above a rear window of the vehicle; and
   an AM radio antenna element located within the interior region, the AM radio antenna element being configured and positioned such that it does not obstruct a light path from the light emitting element to the outer lens element, the AM radio antenna element being located external to and above the rear window of the vehicle.

16. The lamp assembly of claim 15, the housing being adapted for attachment to an exterior trim panel attached to the upper rear portion of the vehicle.

17. The lamp assembly of claim 16, wherein the AM radio antenna element is shaped and sized in accordance with electrically conductive structures of the vehicle located proximate the upper rear portion of the vehicle.

18. The lamp assembly of claim 15, further comprising an FM antenna element located within the interior region, the FM antenna element being configured and positioned such that it does not obstruct the light path from the light emitting element to the outer lens element.

19. The lamp assembly of claim 15, the housing being formed from a dielectric material.

20. The lamp assembly of claim 15, wherein the housing and the outer lens element are cooperatively configured such that the AM radio antenna element is hidden from an external view of the lamp assembly.

* * * * *